(12) United States Patent
Tanaka (10) Patent No.: US 8,832,501 B2
(45) Date of Patent: Sep. 9, 2014

(54) SYSTEM AND METHOD OF PROCESSING FAILURE

(71) Applicant: Fujitsu Limited, Kawasaki (JP)

(72) Inventor: Ryota Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 13/777,808

(22) Filed: Feb. 26, 2013

(65) Prior Publication Data

US 2013/0166953 A1    Jun. 27, 2013

Related U.S. Application Data

(63) Continuation of application No. PCT/JP2010/064966, filed on Sep. 1, 2010.

(51) Int. Cl.
*G06F 11/00* (2006.01)
*G06F 11/07* (2006.01)

(52) U.S. Cl.
CPC ................................. *G06F 11/079* (2013.01)
USPC ............................................ 714/31; 714/43

(58) Field of Classification Search
CPC ............ G06F 11/0745; G06F 11/2005; G06F 11/2012
USPC ........................................ 714/31, 43, 44, 4.5
See application file for complete search history.

(56) References Cited

U.S. PATENT DOCUMENTS

| | | | |
|---|---|---|---|
| 6,430,710 B1 | 8/2002 | Moriyama et al. | |
| 6,704,812 B2 * | 3/2004 | Bakke et al. | 710/38 |
| 7,020,076 B1 * | 3/2006 | Alkalai et al. | 370/217 |
| 7,370,224 B1 * | 5/2008 | Jaswa et al. | 714/4.12 |
| 7,487,403 B2 * | 2/2009 | Hsu et al. | 714/44 |
| 7,779,308 B2 * | 8/2010 | Brown et al. | 714/48 |
| 7,975,167 B2 | 7/2011 | Takaoka | |
| 8,381,027 B1 * | 2/2013 | Liu et al. | 714/13 |
| 2005/0195736 A1 * | 9/2005 | Matsuda | 370/216 |
| 2008/0177926 A1 | 7/2008 | Minami | |
| 2009/0228745 A1 * | 9/2009 | Sota et al. | 714/57 |

FOREIGN PATENT DOCUMENTS

| | | |
|---|---|---|
| JP | 5-282167 | 10/1993 |
| JP | 11-259383 | 9/1999 |
| JP | 2005-011379 | 1/2005 |
| JP | 2008-176564 | 7/2008 |
| JP | 2009-217435 | 9/2009 |
| JP | 2010-092112 | 4/2010 |

OTHER PUBLICATIONS

International Search Report, mailed in connection with PCT/JP2010/064966 and mailed Nov. 22, 2010.

* cited by examiner

*Primary Examiner* — Philip Guyton
(74) *Attorney, Agent, or Firm* — Fujitsu Patent Center (57) ABSTRACT

A system includes a first obtaining unit that, when a failure occurs in the system, obtains via a first route failure information held by devices connected with a first processing unit and a second processing unit, respectively through a first route and a second route, a second obtaining unit that obtains the failure information through the second route when the failure information is not able to be obtained by the first obtaining unit, a second failure location estimation unit that estimates a failure causing location based on the failure information obtained by the second obtaining unit, an identification unit that identifies a subject using the failure location estimated by the second failure location estimation unit, and a termination unit that terminates the subject identified by the identification unit.

8 Claims, 10 Drawing Sheets

| Severity | Date/Time | Unit | Source | Description |
|---|---|---|---|---|
| Error | xx/xx/xx xx:xx:xx | IO | SWITCH30 port1 | Surprise Down Error |
| Error | xx/xx/xx xx:xx:xx | IO | SWITCH32 port0 | Master Abort |
| Error | xx/xx/xx xx:xx:xx | IO | SWITCH32 port2 | Internal Uncorrectable Error |

SYSTEM AND METHOD OF PROCESSING FAILURE

CROSS-REFERENCE TO RELATED APPLICATION

This application is a continuation application of International Application PCT/JP2010/064966 filed on Sep. 1, 2010, the entire contents of which are incorporated herein by reference.

FIELD

The present invention relates to a system and a method of processing a failure.

BACKGROUND

A technology has been known, which reads failure information from a RAM (random access memory) provided in a system and analyzes the failure information when a failure occurs in the system. Further, a method of estimating a failure causing location by analyzing the failure information (Fault Location) has been known.

Figure 9:
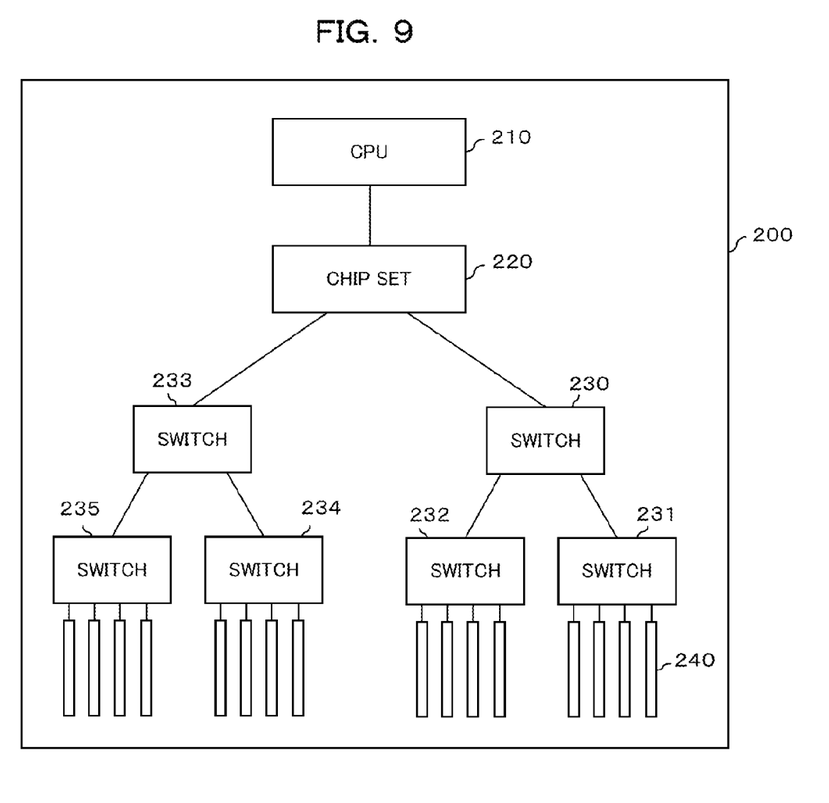
FIG. 9 is a diagram of a hardware configuration of a system in the related art.

The method of estimating the failure causing location will be described by using FIG. 9. FIG. 9 is a diagram illustrating a hardware configuration of a system in the related art. Herein, a system 200 includes a CPU (central processing unit) 210, a chip set 220, PCI (peripheral component interconnect)-Express switches (hereinafter, may be simply referred to as switches) 230 to 235, and a PCI-Card 240. The switch 230 is connected to communicate with the switch 231 and the switch 232 through a PCI-Express bus and the switch 233 is connected to the switch 234 and the switch 235 through the PCI-Express bus. Further, the chip set 220 is connected to communicate with the switch 230 and the switch 233 through the PCI-Express bus. In addition, the PCI-Card 240 is connected to each of the switches 231, 232, 234, and 235 through the PCI-Express bus.

In the system 200 configured as above, for example, when a failure occurs in the switch 232, the chip set 220 notifies the occurrence of the failure by interrupting the CPU 210. The CPU 210 is interrupted by the chip set 220 to detect that the failure occurs in the system 200. Further, when the CPU 210 detects that the failure occurs, the CPU 210 reads respective registers of the chip set 220, the switches 230 to 235, and the PCI-Card 240, analyzes a cause of the failure, and estimates a failure causing location, through the PCI-Express bus.

Figure 10:
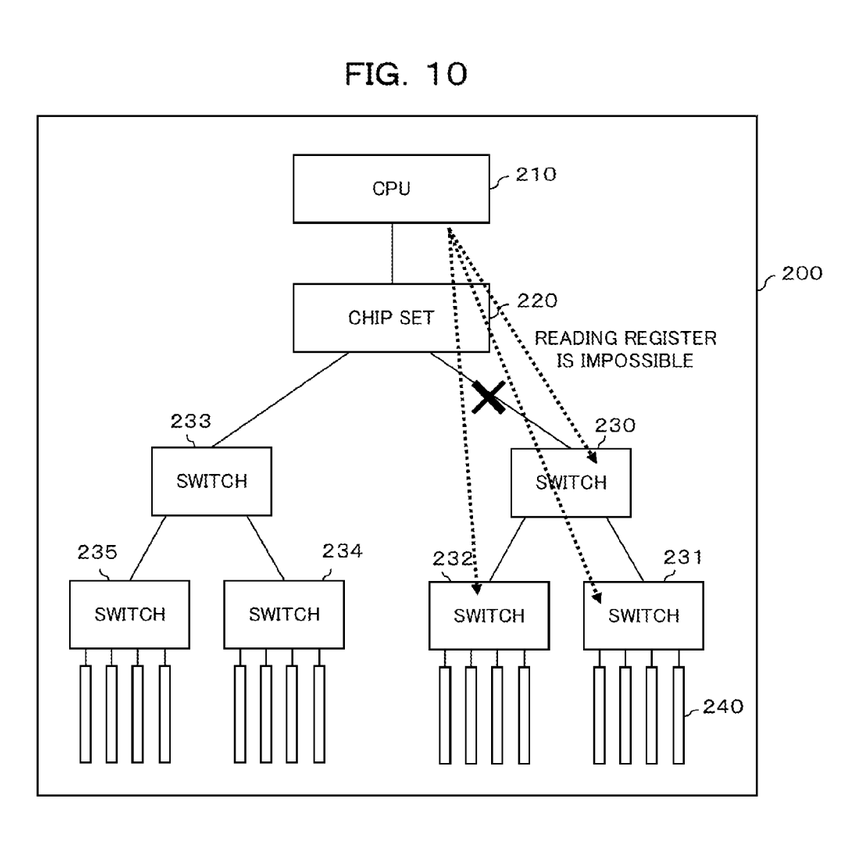
FIG. 10 is a diagram for describing a case in which a register is not able to be read in the system in the related art.

However, a state in which the register is not able to be read (master abort) may occur due to various causes such as link breakage of the PCI-Express bus or hang of a PCI-Express transmission/reception buffer. FIG. 10 is a diagram for describing a case in which the register is not able to be read.

As illustrated in FIG. 10, for example, when link breakage occurs in the PCI-Express bus between the chip set 220 and the switch 230, the CPU 210 is not able to read the respective registers of the switches 230 to 232 or the PCI-Card 240 connected to the switches 231 and 232.

Therefore, the failure causing location is not able to be estimated in detail, and for example, in order to remove the failure, all components of the switches 230 to 232 and the PCI-Card 240 connected to the switches 231 and 232 are to be replaced.

That is, when master abort occurred, a failure causing location is not able to be estimated in detail.

Patent Document 1: Japanese Laid-open Patent Publication No. 05-282167

SUMMARY

A system includes: a first processing unit; a second processing unit; and devices connected to the first processing unit via a first route and connected to the second processing unit via a second route, wherein the first processing unit includes a first obtaining unit that obtains failure information held by the devices via the first route when a failure occurs in the system, and a first notification unit that notifies to the second processing unit non-response information indicating a state in which the failure information is not able to be obtained when the failure information is not able to be obtained from the devices by the first obtaining unit, the second processing unit includes, a second obtaining unit that obtains the failure information from the devices via the second route when the non-response information is notified from the first notification unit, a second failure location estimation unit that estimates a failure causing location on the basis of the failure information obtained by the second obtaining unit, and a second notification unit that notifies the failure location estimated by the second failure location estimation unit to the first processing unit, and the first processing unit includes, an identification unit that identifies a subject using the failure location estimated by the second failure location estimation unit, and a termination unit that terminates the subject identified by the identification unit.

Further, a method of processing a failure in a system including a first processing unit and a second processing unit, includes: obtaining, by the first processing unit, failure information held by devices connected to the first processing unit and the second processing unit via a first route and a second route respectively, via the first route when a failure occurs in the system; notifying, by the first processing unit, to the second processing unit non-response information indicating that the devices make non-response, when failure information is not able to be obtained by the first processing unit; obtaining, by the second processing unit, failure information from the devices via the second route when the non-response information is notified by the first processing unit; estimating, by the second processing unit, a failure causing location on the basis of the failure information obtained by the second processing unit; notifying, by the second processing unit, to the first processing unit the failure location estimated by the second processing unit; identifying, by the first processing unit, a subject using the failure location estimated by the second processing unit; and terminating the subject identified by the first processing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments according to a system and a method of processing a failure of the present invention will be described with reference to the accompanying drawings.

Figure 1:
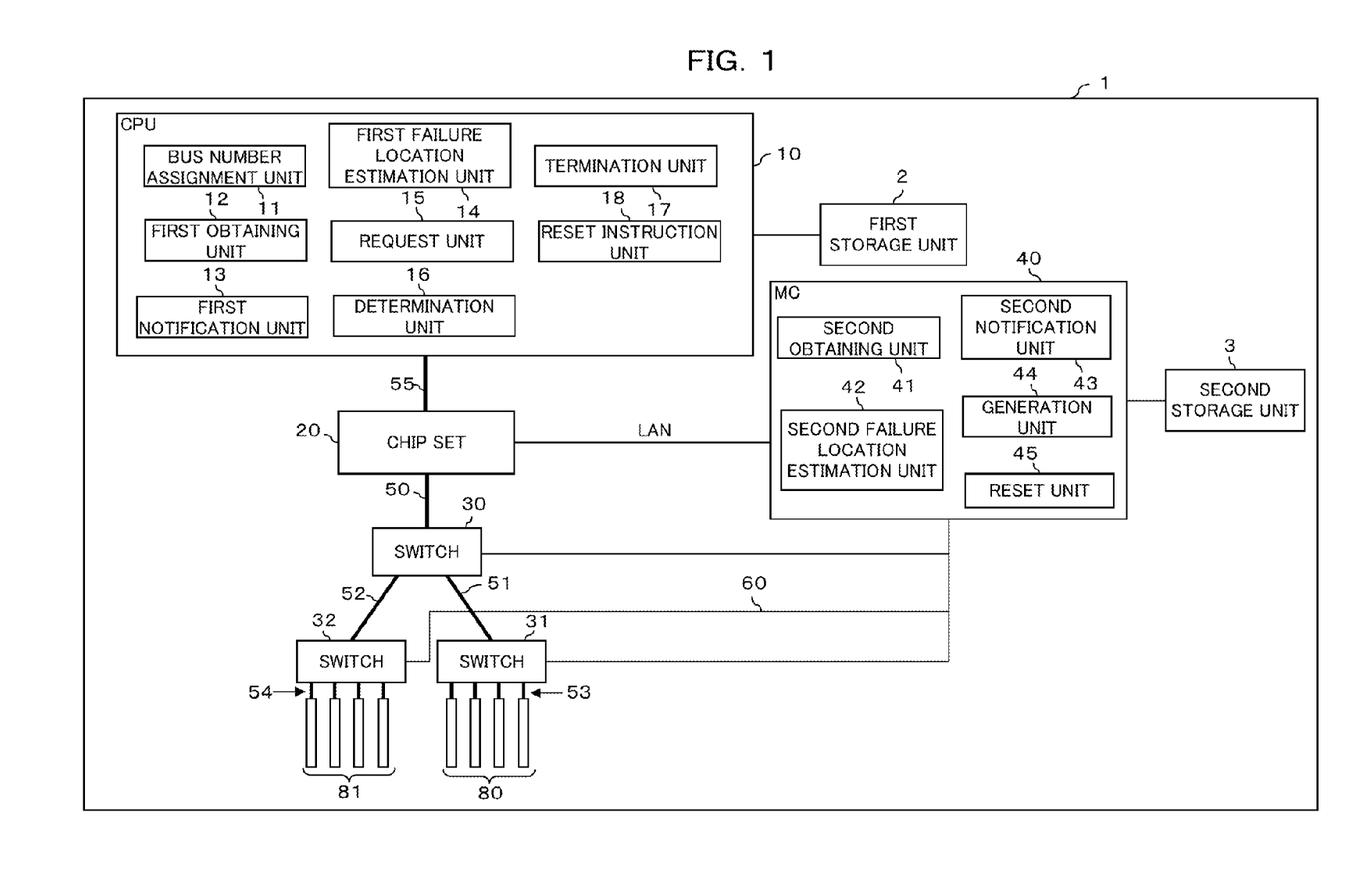
FIG. 1 is a diagram illustrating a configuration of a system according to an example of an embodiment.
Figure 2:
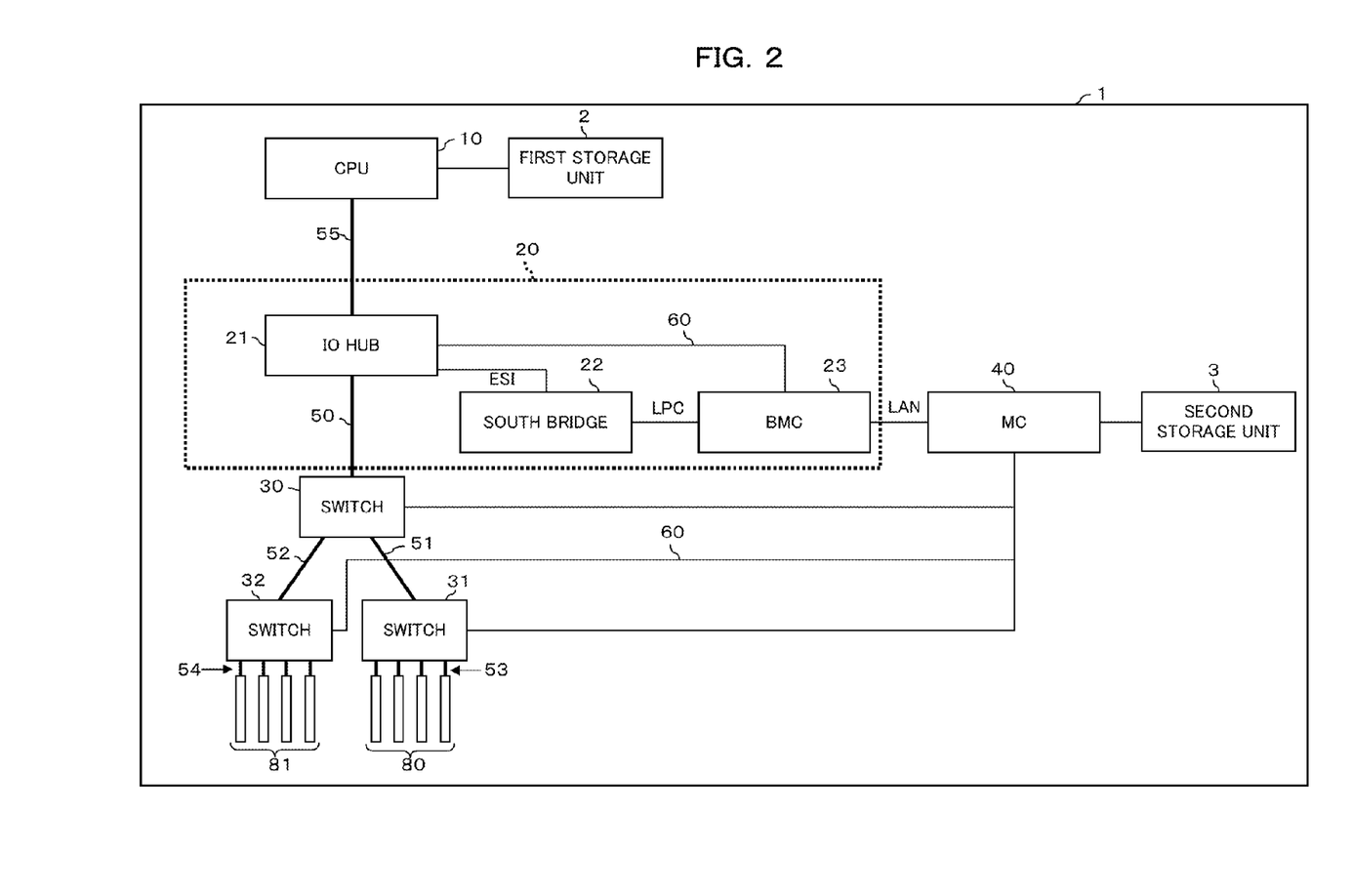
FIG. 2 is a diagram illustrating a detailed hardware configuration of the system according to an example of an embodiment.

FIG. 1 is a diagram illustrating a configuration of a system according to an example of an embodiment. FIG. 2 is a diagram illustrating a detailed hardware configuration of the system according to an example of an embodiment. A system 1 includes a first memory unit 2, a second memory unit 3, a CPU 10, a chip set 20, PCI-Express switches 30 to 32, an MC (micro controller) 40, PCI-Express buses 50 to 54, an I2C (inter-integrated circuit) bus 60, a plurality of PCI-Cards 80, and a plurality of PCI-Cards 81. Herein, the system 1 is, for example, an IO (input/output) sub-system.

The CPU 10 and the chip set 20 are connected to communicate with each other through, for example, a QPI (quick path interconnect) bus 55. The chip set 20 is connected to communicate with the switch 30 through the PCI-Express bus 50. Further, the switch 30 is connected to communicate with the switches 31 and 32 through the PCI-Express buses 51 and 52, respectively. In addition, the switch 31 is connected to communicate with the plurality of (four in the example illustrated in FIG. 1) PCI-Cards 80 respectively through the PCI-Express bus 53. Further, the switch 32 is connected to communicate with the plurality of (four in the example illustrated in FIG. 1) PCI-Cards 81 respectively through the PCI-Express bus 54. The CPU 10, the chip set 20, the PCI-Express switches 30 to 32, and the PCI-Cards 80 and 81 are connected through the QPI bus 55 and the PCI-Express buses 50 to 54 with the CPU 10 as a top and the PCI-Cards 80 and 81 as a bottom (an example of a first route) in multiple layers.

Further, the switches 30 to 32 are connected to communicate with the MC 40 through the I2C bus 60. In addition, the first memory unit 2 is connected to communicate with the CPU 10 and the second memory unit 3 is connected to communicate with the MC 40. Further, the MC 40 and the chip set 20 are connected to communicate with each other through a LAN (local area network).

The respective switches 30 to 32 are communication devices that have a switching function of lines or packets. The respective switches 30 to 32 include a plurality of ports connected by, for example, the PCI-Express bus and output information received in a predetermined port from an arbitrary port.

Figure 3:
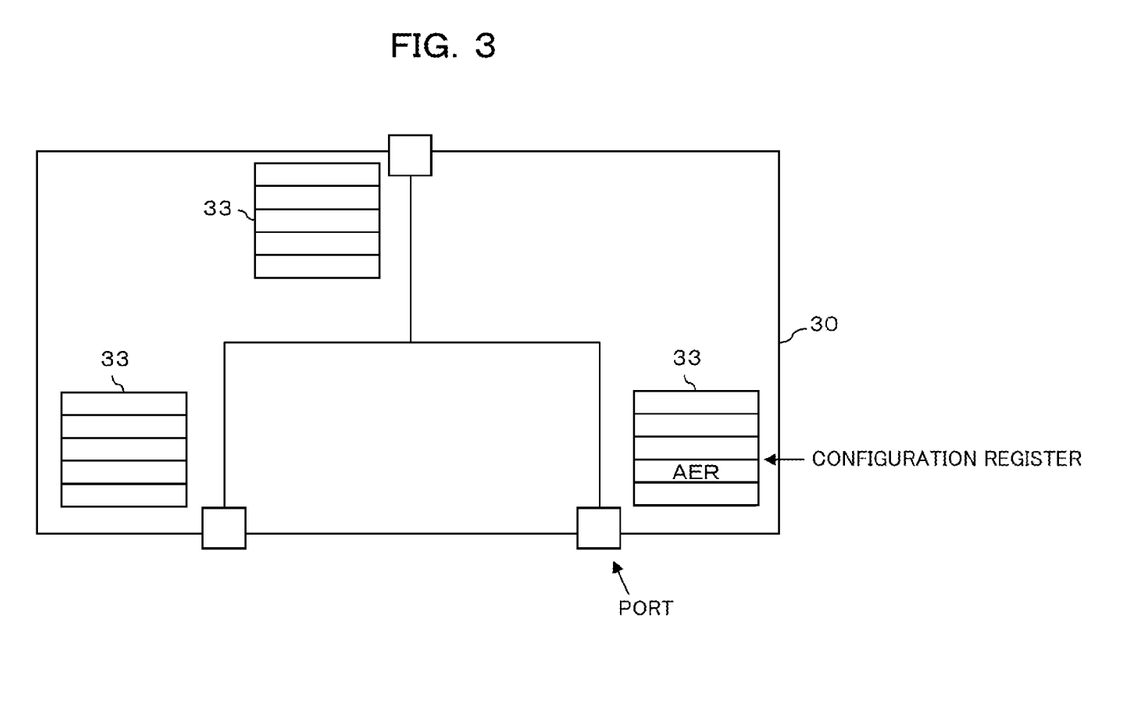
FIG. 3 is a diagram illustrating a configuration of a switch according to an example of an embodiment.

FIG. 3 is a diagram illustrating a configuration of the switch 30 as an example of the embodiment. As illustrated in FIG. 3, the switch 30 includes, for example, a plurality of (three in the example illustrated in FIG. 3) ports and includes a PCI configuration register (hereinafter, simply referred to as a configuration register) 33 for each port. Herein, when a failure occurs, each of the plurality of ports records failure information in the configuration register 33 by detecting the failure. In more detail, the failure information is recorded in an AER (advance error reporting) register which is a part of the configuration register 33. Herein, the failure information is information that represents a content of the failure and, for example, when link breakage of the PCI-Express bus connected to the port occurs, a surprise down error is recorded in the AER register. Further, as the failure information recorded in the AER register, known information may be used.

Further, the respective plurality of ports transmit a fatal-error message packet to an IO hub 21 (to be described below) of the chip set 20 at the time of detecting the failure. In addition, the fatal-error message packet is defined in the written specification of PCI-Express and a detailed description thereof will be omitted.

The switches 31 and 32 have the same configuration as the switch 30 and a detailed description thereof will be omitted. Further, in the example illustrated in FIG. 1, each of the switches 31 and 32 includes five or more ports. The respective plurality of ports of the switch 31 transmit the fatal-error message packet to the IO hub 21 of the chip set 20 through the switch 30 when the failure is detected. In detail, the respective plurality of ports of the switch 31 transmit the fatal-error message packet to the switch 30 when the failure is detected and the switch 30 that receives the fatal-error message packet transmits the received fatal-error message packet to the IO hub 21.

Similarly, the respective plurality of ports of the switch 32 transmit the fatal-error message packet to the IO hub 21 of the chip set 20 through the switch 30 when the failure is detected. In detail, the respective plurality of ports of the switch 32 transmit the fatal-error message packet to the switch 30 when the failure is detected and the switch 30 that receives the fatal-error message packet transmits the received fatal-error message packet to the IO hub 21.

Further, for example, a processing circuit of the port executes predetermined firmware, and as a result, a function to detect the failure, a function to record the failure information in the AER register, or a function to transmit the fatal-error message packet is implemented.

The chip set 20 is a circuit that connects the CPU 10 and the switch 30, and for example, converts QPI into PCI-Express. In detail, as illustrated in FIG. 2, the chip set 20 includes the IO hub 21, a southbridge 22, and a BMC (baseboard management controller) 23. Further, the IO hub 21 and the southbridge 22 are connected to communicate with each other through, for example, an ESI (enterprise southbridge interface) bus. Further, the southbridge 22 and the BMC 23 are connected to communicate with each other through, for example, an LPC (low pin count) bus. In addition, the BMC 23 is connected to communicate with the MC 40 through the LAN. Further, the IO hub 21 is connected to communicate with the BMC 23 through the I2C bus 60.

The IO hub 21 is LSI (large scale integrated) that converts the QPI into the PCI-Express. Further, when the IO hub 21 receives the fatal-error message packet from a lower device, that is, the switch 30 or the IO hub 21 itself, the IO hub 21 issues, for example, SMI (system management interrupt) to the CPU 10. Note that, the IO hub 21 includes Root Complex. The Root Complex is a chip set for connecting the CPU 10 with an IO device such as the switch 30, and the like and converts the QPI into the PCI-Express. The Root Complex includes at least one or more ports and includes the configuration register 33 similarly to the switches 30 to 32. Further, the Root Complex is a device that is positioned on the most upper layer of the PCI-Express.

When a failure occurs, the port of the IO hub 21 records the failure information in the configuration register 33 by detecting the failure. In more detail, the failure information is recorded in the AER register which is a part of the configuration register 33. The port of the IO hub 21 transmits the fatal-error message packet to the IO hub 21 when the failure is detected. When the IO hub 21 receives the fatal-error message packet from its own failure port, the IO hub 21 issues the SMI interrupt to the CPU 10 similarly to the time of receiving the fatal-error message packet from the switch 30, and the like.

Note that, for example, a processing circuit of the port of the IO hub 21 executes predetermined firmware, and as a result, the function to detect the failure, the function to record the failure information in the AER register, or the function to transmit the fatal-error message packet is implemented.

The southbridge 22 controls, for example, a device on the LPC bus. The BMC 23 monitors a hardware error in the system 1, such as, for example, monitoring a state of the CPU 10.

The respective PCI-Cards 80 and 81 are extension cards that provide various functions prepared according to the specification of the PCI and for example, a network card or a sound card. Further, the respective PCI-Cards 80 and 81 include at least one or more ports and include the configuration register 33 (for each port) similarly to the switches 30 to 32. When the failure occurs, the respective ports of the PCI-Cards 80 and 81 record the failure information in the configuration register 33 by detecting the failure. In more detail, the failure information is recorded in the AER register which is a part of the configuration register 33. The respective ports of the PCI-Cards 80 and 81 transmit the fatal-error message packet to the IO hub 21 through the switches 31/32 and the switch 30 that are connected, when the failure is detected. In detail, the port of the PCI-Card 80 transmits the fatal-error message packet to the switch 32 that is connected, when the failure is detected. Then, the switch 32 transmits the received fatal-error message packet to the switch 30 and the switch 30 further transmits the fatal-error message packet transmitted from the switch 32 to the IO hub 21, to the IO hub 21. Further, the port of the PCI-Card 81 transmits the fatal-error message packet to the switch 31 that is connected, when the failure is detected. Then, the switch 31 transmits the received fatal-error message packet to the switch 30 and the switch 30 further transmits the fatal-error message packet transmitted from the switch 32 to the IO hub 21, to the IO hub 21.

Further, for example, processing circuits of the respective ports of the PCI-Cards 80 and 81 execute predetermined firmware, and as a result, the function to detect the failure, the function to record the failure information in the AER register, or the function to transmit the fatal-error message packet is implemented.

The first memory unit 2 is, for example, a ROM (read only memory) and memorizes various information. In detail, the first memory unit 2 memorizes a BIOS.

The second memory unit 3 is, for example, a ROM and memorizes various information. In detail, the second memory unit 3 memorizes system management firm.

The CPU 10 is a processing device that performs various operations or controls by executing, for example, the BIOS memorized in the first memory unit 2, an OS or various application programs memorized in an auxiliary memory device (embedded HDD (hard disk drive) or an externally attached storage system) (not illustrated), and implements various functions. The CPU 10 serves as a first processing unit.

For example, the CPU 10 executes the BIOS to serve as a bus number assignment unit 11, a first obtaining unit 12, a first notification unit 13, a first failure location estimation unit 14, and a request unit 15, as illustrated in FIG. 1. Further, for example, the CPU 10 executes the OS to serve as a determination unit 16, a termination unit 17, and a reset instruction unit 18, as illustrated in FIG. 1. Note that, the OS may have one or more functions among the functions as the first obtaining unit 12, the first notification unit 13, the first failure location estimation unit 14, and the request unit 15 or the BIOS may have one or more functions among the functions as the determination unit 16, the termination unit 17, and the reset instruction unit 18.

The bus number assignment unit 11 assigns bus numbers for identifying the buses to a PCI-Express bus (not illustrated) in the IO hub 21, the PCI-Express buses 50 to 54, and the PCI-Express bus in each of the switches 30 to 32, which the system 1 has, for example, when the system 1 is actuated. The bus numbers are assigned according to a bus assignment rule of the PCI. Herein, the PCI-Express bus in the IO hub 21, the QPI bus 55, the PCI-Express busses 50 to 54, and the PCI-Express bus in each of the switches 30 to 32 correspond to an example of a first route. That is, the bus number assignment unit 11 assigns the bus numbers to the first route.

Figure 4:
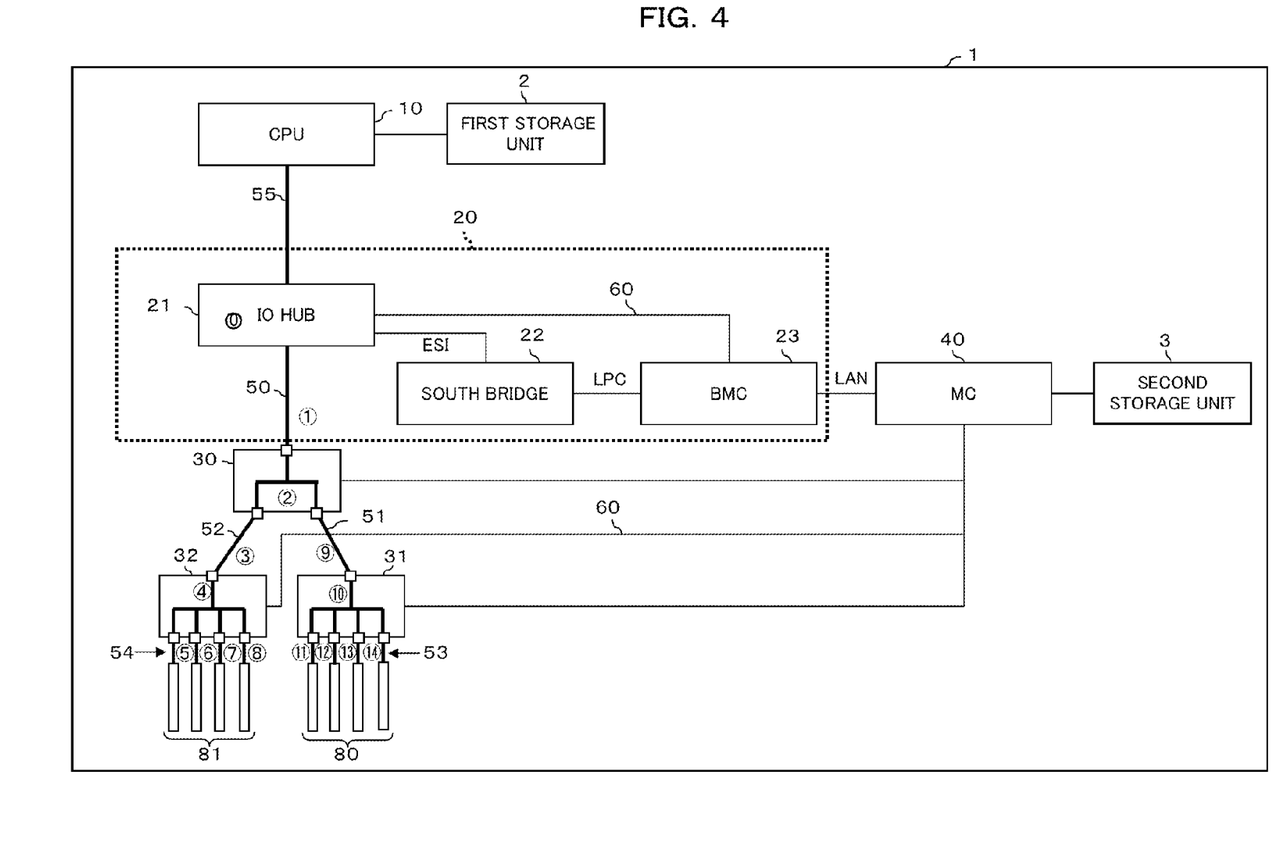
FIG. 4 is a diagram for describing an operation of an assignment unit according to an example of an embodiment.

FIG. 4 is a diagram illustrating an example of a state in which the bus number assignment unit 11 assigns the bus numbers with respect to the system 1. In FIG. 4, circled numbers represent the bus numbers. The bus number assignment unit 11 assigns bus numbers 1, 3, and 9 to the PCI-Express buses 50, 52, and 51, respectively and the bus number assignment unit 11 assigns bus numbers 5 to 8 to the four PCI-Express buses 54 and bus numbers 11 to 14 to the four PCI-Express buses 53, respectively. Further, the bus number assignment unit 11 assigns bus numbers 2, 4, and 10 to the PCI-Express buses that connect the ports of the switches 30, 32, and 31, respectively. Further, the bus number assignment unit 11 assigns a bus number 0 to the PCI-Express bus in the IO hub.

When the first obtaining unit 12 receives the SMI (system management interrupt) from the IO hub 21, the first obtaining unit 12 reads the failure information from each AER register provided in the system 1. The reading of the AER register by the first obtaining unit 12 is performed by the QPI bus 55 connecting the CPU 10 and the chip set 20, the PCI-Express buses 50 to 54, and the PCI-Express buses that connect the ports of the switches 30 to 32. Herein, the first obtaining unit 12 reads and obtains, for example, values (contents) of the AER registers of the configuration registers 33 of the IO hub 21, the switches 30 to 32, and the PCI-Cards 80 and 81. That is, the first obtaining unit 12 serves as a first obtaining unit that obtains the failure information through the first route.

Note that, when the first obtaining unit 12 is not able to read a content of an AER register for a predetermined time, the IO hub 21 outputs information indicating a gist that master abort occurs, to the CPU 10. In other words, when the master abort occurs, the first obtaining unit 12 obtains information indicating that the master abort occurs, from the IO hub 21 to detect the occurrence of the master abort. Note that, the master abort indicates, for example, a state in which the configuration register 33 is not able to be read due to a problem in devices connected to the PCI-Express bus or various failures such as link breakage of the PCI-Express bus, or because the device is not installed on the PCI-Express bus.

Herein, the information indicating the gist that the master abort occurs is, for example, data of 4 bytes of which all are "1". Note that, the IO hub 21 may, for example, determine whether a predetermined time elapsed by using its own timer.

When the master abort occurs, the first obtaining unit 12 stops reading the AER register and records a bus number in which the master abort occurs in, for example, a register of the CPU 10. Herein, the bus number in which the master abort occurs is a bus number which the first obtaining unit 12 uses to read the AER register when the first obtaining unit 12 detects the master abort. In other words, the bus number in which the master abort occurs is the number of a bus connected to an upper layer side of an AER register in which the first obtaining unit 12 does not read information.

The first notification unit 13 notifies the gist in which the master abort occurs (non-response information) and information indicating a place where the master abort occurs to the MC 40 (an example of the second processing unit) when the first obtaining unit 12 obtains the information indicating the gist that the master abort occurs. In detail, the first notification unit 13 notifies, for example, a flag indicating that the master abort occurs and a bus number (positional information) in which the master abort occurs to the MC 40 through the IO hub 21, an ESI hub, the southbridge 22, an LPC hub, and the BMC 23. The notification from the first notification unit 13 to the MC 40 is performed by using, for example, IPMI (intelligent platform management interface) communication.

The first failure location estimation unit 14 estimates the failure causing location based on, for example, the content of the AER register obtained by the first obtaining unit 12. In detail, the first failure location estimation unit 14 estimates a location (corresponding to a register storing error information) in the system 1 where a surprise down error is recorded as the failure causing location when the first obtaining unit 12 obtains the information indicating the gist that the failure occurs from the AER register, for example, the surprise down error. Further, the first failure location estimation unit 14 estimates even a device in which the first obtaining unit 12 does not obtain the content of the AER register as the failure causing location by the occurrence of the master abort.

Note that, the first failure location estimation unit 14 may be implemented by using various known methods and a detailed description thereof will not be made.

The request unit 15 requests generation of system failure information to be described below to, for example, the MC 40. In detail, the request unit 15 notifies the failure causing location estimated by the first failure location estimation unit 14 and the content of the AER register obtained by the first obtaining unit 12 from the corresponding failure causing location, to the MC 40. The request unit 15 requests the generation of the system failure information to be described below to the MC 40 simultaneously with or approximately simultaneously with the notification of the failure location and the content of the AER register. That is, the request unit 15 serves as a third notification unit that notifies the failure causing location estimated by the first failure location estimation unit 14 and the content of the AER register of the corresponding failure causing location to the MC 40.

Further, the notification and the request by the request unit 15 are performed through, for example, the IO hub 21, the ESI hub, the southbridge 22, the LPC hub, and the BMC 23. In addition, the notification and the request from the request unit 15 to the MC 40 are performed by using, for example, the IPMI communication.

Further, the request unit 15 requests the generation of the system failure information to, for example, the MC 40 and performs NMI (non-maskable interrupt) with respect to the CPU 10. Herein, the NMI is an interrupt which is unpreventable from software.

The determination unit 16 determines whether the failure location is separable based on the failure causing location estimated by a second failure location estimation unit 42 when receiving, for example, the NMI and a notification from a second notification unit 43 to be described below. Further, when the master abort does not occur, the determination unit 16 determines whether the failure location is separable (same as above) based on the failure causing location estimated by the first failure location estimation unit 14. Herein, the separation of the failure location represents a state in which an application and the like do not use the failure causing location while the system 1 continuously operates (without resetting the system 1).

In detail, for example, the determination unit 16 identifies a subject such as an application that uses the failure causing location estimated by the second failure location estimation unit 42 or the first failure location estimation unit 14. Then, the determination unit 16 determines that the failure location is separable, for example, when the subject such as all applications that operates in the system 1 does not use the failure causing location estimated by the second failure location estimation unit 42 or the first failure location estimation unit 14. Further, when it is determined that the failure location is separable, the application or a virtual machine that uses the failure causing location estimated by, for example, the second failure location estimation unit 42 or the first failure location estimation unit 14 is terminated by the termination unit 17 to be described below. In other words, the determination unit 16 determines that the failure location is separable when only some of all the subjects that operate in the system 1 use the failure causing location estimated by the second failure location estimation unit 42 or the first failure location estimation unit 14.

Meanwhile, the determination unit 16 determines that the failure location is inseparable when the subject such as all applications that operates in the system 1 uses the failure causing location estimated by the second failure location estimation unit 42 or the first failure location estimation unit 14.

Herein, the "subject" is, for example, an application or a virtual machine, or a hardware resource used by the application or the virtual machine. That is, the determination unit 16 serves as an identification unit that identifies the subject that uses the failure location.

Note that, since the OS grasps the application or the virtual machine that operates in the system 1, the application or the virtual machine that uses the failure causing location estimated by the second failure location estimation unit 42 or the first failure location estimation unit 14 may be identified by using a function of the OS.

When the determination unit 16 determines that the failure location is separable, the termination unit 17 terminates the application or the virtual machine that uses the failure causing location estimated by, for example, the second failure location estimation unit 42 or the first failure location estimation unit 14.

For example, in FIG. 1, when an application A uses the PCI-Card 80 and an application B uses the PCI-Card 81, in the case where the switch 31 connected to the PCI-Card 80 is out of order, the termination unit 17 terminates the application A. As a result, the application B is operable without stopping the system 1.

The reset instruction unit 18 instructs, for example, the MC 40 to reset the system 1. For example, in detail, the reset instruction unit 18 instructs resetting by writing a reset flag in the register of the MC 40.

The MC 40 is a processing device which performs various operations or controls by executing, for example, system management firm memorized in the second memory unit 3, and accordingly, implements various functions.

For example, the MC 40 serves as the second obtaining unit 41, the second failure location estimation unit 42, the second notification unit 43, a generation unit 44, and a reset unit 45, by executing the system management firm.

The second obtaining unit 41 reads the content of the AER register through the I2C bus 60 (an example of a second route), for example, when receiving the notification of the gist in which the master abort occurs and the bus number in which the master abort occurs, from the first notification unit 13. In detail, the second obtaining unit 41 reads the content of the AER register which the first obtaining unit 12 does not obtain, among the AER registers of the configuration registers 33 of the IO hub 21, the switches 30 to 32, and the PCI-Cards 80 and 81. That is, the second obtaining unit 41 serves as a second obtaining unit that obtains the failure information through the second route.

In detail, the second obtaining unit 41 reads the AER register which is positioned on a lower layer than the bus number in which the master abort occurs.

Herein, since the assignment of the bus number by the assignment unit 11 follows the bus assignment rule of the PCI, the MC 40 may grasp how the bus number is assigned. Further, since an I2C address is fixedly assigned to the device in the system 1 and the MC 40 grasps the position of the device in the system 1, the MC 40 grasps a correspondence of the position of the device in the system 1 and the I2C address. Therefore, the second obtaining unit 41 may make the bus number and the I2C address to correspond to each other and identify the position of the device in the system 1 based on the bus number. That is, the second obtaining unit 41 may identify the AER register to be read based on the bus number.

The second failure location estimation unit 42 estimates the failure causing location based on, for example, the content of the AER register obtained by the second obtaining unit 41. In detail, the second failure location estimation unit 42 estimates the location in the system 1, in which an internal uncorrectable error is recorded, as the failure causing location, when the second obtaining unit 41 obtains, from the AER register, information indicating a gist that the failure occurs, for example, the internal uncorrectable error indicating an uncorrectable error in the respective devices such as, for example, the IO hub 21, the switches 30 to 32, and the PCI-Cards 80 and 81.

Note that, the second failure location estimation unit 42 may be implemented by using various known methods and a detailed description thereof will not be made.

The second notification unit 43 notifies to the CPU 10, for example, the failure causing location estimated by the second failure location estimation unit 42 and/or the content of the AER register of the failure causing location estimated by the second failure location estimation unit 42. The notification from the second notification unit 43 to the CPU 10 is performed by using, for example, the IPMI communication.

The generation unit 44, for example, generates the system failure information and records the generated system failure information in the second memory unit 3. Herein, the system failure information is information in which a manager of the system 1 refers to the failure causing location and at least includes information indicating the failure causing location. In detail, the generation unit 44 generates the system failure information by combining the failure causing locations respectively estimated by the first failure location estimation unit 14 and the second failure location estimation unit 42, the failure information obtained from the failure causing locations, and the location where the master abort occurs. Note that, the failure causing location estimated by the first failure location estimation unit 14 and the failure information obtained from the failure causing location are notified from the request unit 15 to the generation unit 44, and the bus number indicating the location where the master abort occurs is notified to the generation unit 44 by the first notification unit 13.

Note that, the generation unit 44 may generate the system failure information based on only the failure causing location estimated by the second failure location estimation unit 42 and the failure information obtained from the failure causing location.

Further, the generation unit 44 generates the system failure information based on, for example, the information notified from the request unit 15 when the master abort does not occur.

The reset unit 45 resets the system 1, for example, when receiving the instruction from the reset instruction unit 18.

Note that, a program (OS) for implementing the functions as the determination unit 16, the termination unit 17, and the reset instruction unit 18 is provided while the program is recorded in a computer-readable recording medium such as, for example, a flexible disk, a CD (a CD-ROM, a CD-R, a CD-RW, and the like), a DVD (a DVD-ROM, a DVD-RAM, a DVD-R, a DVD+R, a DVD-RW, a DVD+RW, an HD DVD, and the like), a Blu-ray disk, a magnetic disk, an optical disk, a magneto-optical disk, and the like. In addition, the computer reads the program from the recording medium and transmits the read program to an internal memory device or an external memory device, in which the program is stored and used. Further, the program may be recorded in the memory device (recording medium) such as, for example, the magnetic disk, the optical disk, the magneto-optical disk, and the like and may be provided to the computer from the memory device through a communication route.

Further, the BIOS may be written in the first memory unit 2 at the time of shipment from the factory and shipped as a product. Further, the system management firm may also be written in the second memory unit 3 at the time of shipment from the factory and shipped as a product.

When the functions as the bus number assignment unit 11, the first obtaining unit 12, the first notification unit 13, the first failure location estimation unit 14, the request unit 15, the determination unit 16, the termination unit 17, and the reset instruction unit 18 are implemented, the program (BIOS) stored in the internal memory device (the first memory unit 2, and the like in the embodiment) and the program (OS) stored in the auxiliary memory device (the embedded HDD or the externally attached storage system) are executed by a microprocessor of the computer. In this case, the program stored in the auxiliary memory device may be executed by the computer's reading the program recorded in the recording medium.

Further, when the functions as the second obtaining unit 41, the second failure location estimation unit 42, the second notification unit 43, the generation unit 44, and the reset unit 45 are implemented, the program stored in the internal memory device (the second memory unit 3, and the like in the embodiment) is executed by the microcomputer of the computer.

Further, in the embodiment, the computer is a concept that includes hardware and an operating system and means hardware that operates under the control of the operating system. Further, when the operating system is unnecessary and an application program singly operates the hardware, the hardware itself corresponds to the computer. The hardware at least includes the microprocessor such as the CPU, and the like and a means for reading the computer program recorded in the recording medium, and in the embodiment, the system 1 has a function as the computer with the CPU 10 and the system 1 has a function as the computer with the MC 40.

Figure 5:
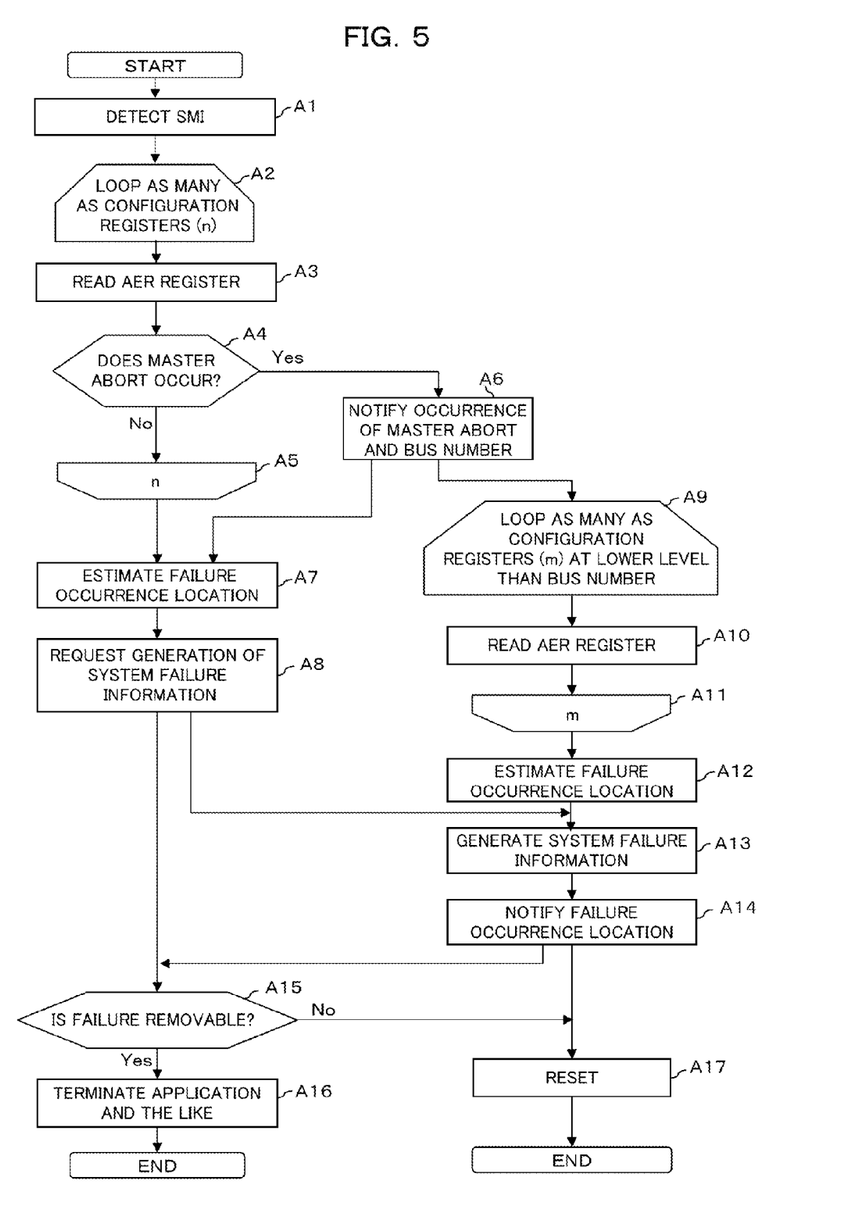
FIG. 5 is a flowchart for describing an operation of a failure detection device according to an example of an embodiment.

FIG. 5 is a flowchart illustrating the operation of the system 1 as an example of the embodiment, which is configured as above.

First, when any error occurs in the system 1, the device (for example, the switch 32) where the error occurs transmits the fatal-error message packet to the IO hub 21. Then, when the IO hub 21 receives the fatal-error message packet, the IO hub 21 issues the SMI to the CPU 10.

When the CPU 10 detects the SMI (step A1), the first obtaining unit 12 reads the content of the AER register of the configuration register 33, which each device in the system 1 has, through the QPI bus 55, the PCI-Express buses 50 to 54, and the like (step A3). Whenever the first obtaining unit 12 performs the reading operation of the AER register, the first obtaining unit 12 determines whether the master abort occurs according to whether the first obtaining unit 12 obtains the information indicating the gist that the master abort occurs (step A4). When it is determined that the master abort does not occur (see a No route of step A4), the process returns to step A2 again (step A5). As long as it is determined that the master abort does not occur (see the No route of step A4), the processing of step A3 and step A4 is repeatedly performed as many as the number n of the configuration registers 33 in the system 1 (see steps A2 to A5). However, when the first obtaining unit 12 obtains the information indicating the gist that the master abort occurs (see a Yes route of step A4), the first obtaining unit 12 stops reading the AER register and stores the bus number in which the master abort occurs in, for example, the register which the CPU 10 has. Then, the first notification unit 13 notifies the gist that the master abort occurs and the bus number in which the master abort occurs, to the MC 40 by, for example, the IPMI communication (step A6). Further, the first failure location estimation unit 14 estimates the failure causing location based on the content of the AER register obtained in step A3 (step A7).

Subsequently, the request unit 15 notifies the failure causing location estimated by the first failure location estimation unit 14 and the content of the AER register, which the first obtaining unit 12 obtains from the failure causing location estimated by the first failure location estimation unit 14, to the MC 40 by, for example, the IPMI communication. The request unit 15 requests the generation of the system failure information to the MC 40 simultaneously with the notification (step A8).

Meanwhile, in step A6, the second obtaining unit 41 of the MC 40 to which the gist in which the master abort occurs and the bus number in which the master abort occurs are notified reads the AER register which is positioned on the lower layer than the bus number in which the master abort occurs, by using the I2C bus 60 (step A10). The processing of step A9 is repeatedly performed as many as the number m of the configuration registers 33 which are positioned on a lower layer than the bus number in which the master abort occurs (see steps A9 to A11). When the second obtaining unit 41 reads AER registers of all devices which are positioned on a lower layer than the bus number in which the master abort occurs, the second failure location estimation unit 42 estimates the failure causing location based on the contents of the read AER registers (step A12). Subsequently, the generation unit 44 generates the system failure information (step A13). In detail, the generation unit 44 generates the system failure information, based on the information notified from the first notification unit 13 in step A6, the information notified from the request unit 15 in step A8, and the content of the AER register depending on the failure location estimated in step A12, and for example, records the generated system failure information in the second memory unit 3. Further, the MC 40 may display the system failure information generated by the generation unit 44 on a display unit (not illustrated).

The second notification unit 43 notifies the failure causing location estimated by the second failure location estimation unit 42 to the CPU 10 by, for example, the IPMI communication (step A14). The determination unit 16 determines whether the failure location is separable based on the failure causing location estimated by the second failure location estimation unit 42, which is notified by the second notification unit 43 (step A15).

When the failure location is separable (see a Yes route of step A15), the termination unit 17 terminates an application or a virtual machine used by the failure location estimated by the second failure location estimation unit 42 which is identified by the determination unit 16 (step A16). Note that, when the failure location is inseparable (see a No route of step A15), the reset instruction unit 18 instructs, for example, the MC 40 to reset the system 1 and the reset unit 45 resets the system 1 (step A17).

Note that, when the first obtaining unit 12 does not obtain the information indicating the gist that the master abort occurs (see a No route of step A4), it is determined whether the failure location is separable based on the failure causing location estimated by the first failure location estimation unit 14 by the determination unit 16 after the aforementioned processing in steps A7 and A8 is performed (step A15). Then, when the failure location is separable (see a Yes route of step A15), the termination unit 17 terminates an application or a virtual machine used by the failure location estimated by the first failure location estimation unit 14 which is identified by the determination unit 16 (step A16). Note that, when the failure location is inseparable (see a No route of step A15), the aforementioned processing of step A17 is performed. In addition, when the master abort does not occur, the generation unit 44 generates the system failure information in step A13 and, for example, records the generated system failure information in the second memory unit 3, based on the information notified from the request unit 15 in step A8. Note that, when the master abort does not occur, the processing of step A14 is not performed.

Subsequently, as an example, in system 1, an operation when link breakage of the PCI-Express bus 52 between the switch 30 and the switch 32 occurs due to an internal error of the switch 32 will be described. Note that, it is based upon the premise that the bus number assignment unit 11 assigns the bus number.

Figure 6:
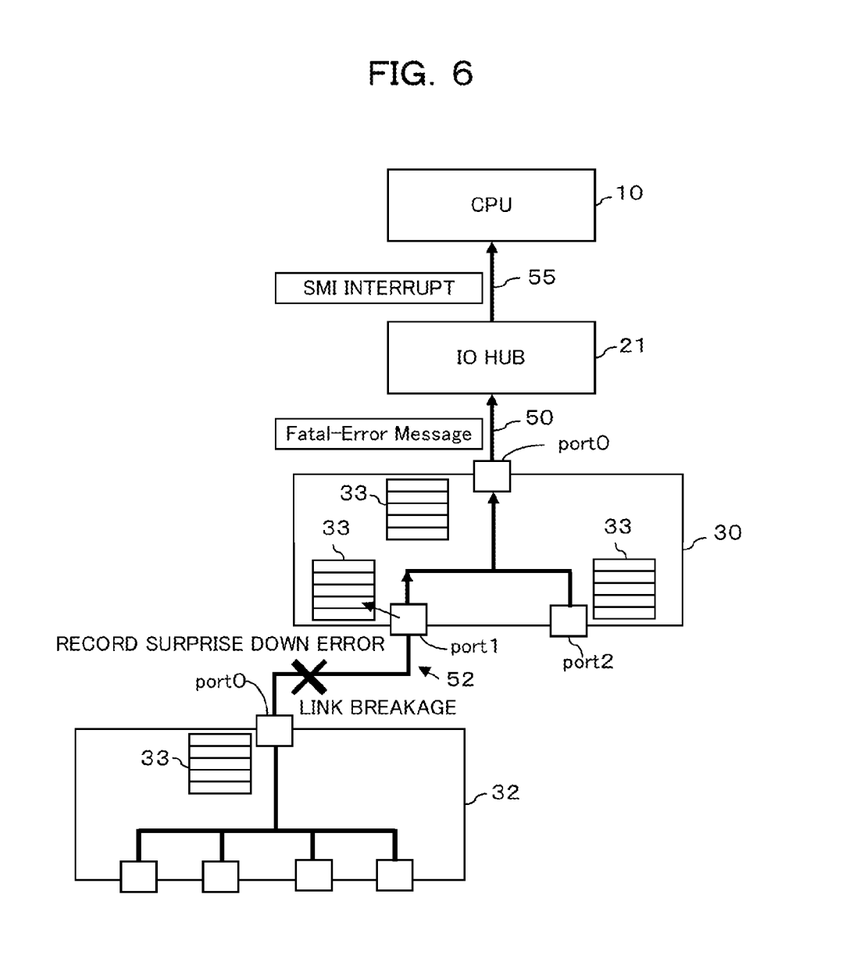
FIG. 6 is a diagram for describing SMI interrupt according to an example of an embodiment.

FIG. 6 is a diagram for describing that the IO hub 21 makes the SMI to occur with respect to the CPU 10. Note that, in FIG. 6, the switch 31 is not illustrated.

As illustrated in FIG. 6, when the link breakage of the PCI-Express bus 52 between the switch 30 and the switch 32 occurs, a port 1 of the switch 30 detects the link breakage of the PCI-Express bus 52 and records, for example, the surprise down error in the AER register of the configuration register 33. Further, the port 1 of the switch 30 transmits the fatal-error message packet to the IO hub 21. The IO hub 21 that receives the fatal-error message packet performs the SMI with respect to the CPU 10. The CPU 10 detects the SMI, and as a result, the first obtaining unit 12 is actuated.

The first obtaining unit 12 may read the AER registers in the IO hub 21, the switches 30 and 31, and the PCI-Card 80. However, since the link breakage of the PCI-Express bus 52 between the switch 30 and the switch 32 occurs, the first obtaining unit 12 is not able to read the AER registers in the switch 32 and the PCI-Card 81 which is positioned on a lower layer of the switch 32. That is, when reading the AER register in the switch 32 through the PCI-Express bus 52, the first obtaining unit 12 obtains the information indicating that the master abort occurs. In addition, the first obtaining unit 12 records the bus number 3 in the register which the CPU 10 has as the bus number in which the master abort occurs.

Subsequently, the first notification unit 13 notifies to the MC 40 the gist that the master abort occurs and the bus number 3.

Further, the first obtaining unit 12 stops reading the AER register and the first failure location estimation unit 14 estimates the failure causing location based on the content of the AER register obtained by the first obtaining unit 12. Herein, based on the surprise down error recorded in the AER register corresponding to the port 1 of the switch 30, the port 1 of the switch 30, and the switch 32 and the PCI-Card 81 connected to a lower layer of the switch 30 are estimated as the failure causing locations. Subsequently, the request unit 15 notifies to the MC 40 the content of the AER register of the switch 30 and the switch 30, the switch 32, and the PCI-Card 81 as the failure causing locations. Further, the request unit 15 requests the generation of the system failure information to the MC 40 simultaneously with the notification. In addition, the request unit 15 may notify only a top location among the locations, which the first failure location estimation unit 14 estimates as the failure causing locations, to the MC 40. That is, the request unit 15 may notify only the switch 30 as the failure causing location and the content of the AER register of the switch 30 to the MC 40.

Meanwhile, in the MC 40 that receives the notification from the first notification unit 13, the second obtaining unit reads the AER register of the device which is connected onto the lower layer than the bus number 3 based on the bus number. Herein, the AER register in the switch 32 and the AER register in the PCI-Card 81 are read.

Figure 7:
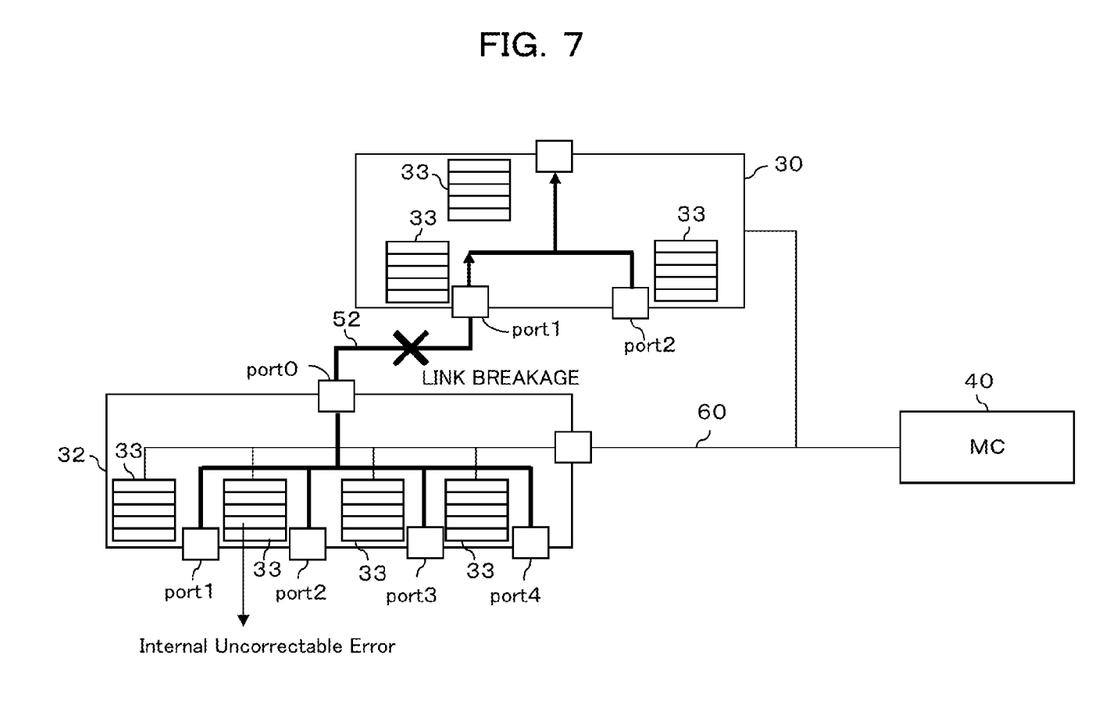
FIG. 7 is a diagram for describing an operation of an MC according to an example of an embodiment.

Herein, as illustrated in FIG. 7, in a case where, for example, the internal uncorrectable error is recorded in the AER register of the configuration register 33 corresponding to a port 2 of the switch 32, the second obtaining unit 41 reads the content of the AER register. Then, the second failure location estimation unit 42 estimates the port 2 of the switch 32 as the failure causing location based on the content of the AER register read by the second obtaining unit 41.

Figure 8:
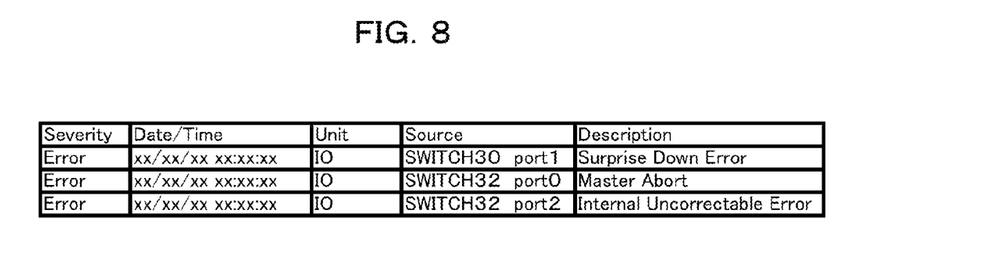
FIG. 8 is a diagram illustrating system failure information according to an example of an embodiment.

Further, the generation unit 44, for example, generates the system failure information illustrated in FIG. 8 and records the generated system failure information in the second memory unit 3. In the system failure information exemplified in FIG. 8, the failure causing location (source) corresponds to the content of the failure (description) and a unit to which the failure causing location belongs. Further, in the system failure information exemplified in FIG. 8, the failure causing location (source) corresponds to a date/time when the first obtaining unit 12 or the second obtaining unit 41 obtains the content of the failure and information indicating the failure (severity).

In detail, the content of the AER register of the port 1 of the switch 30 corresponds to the port 1 of the switch 30 which is the top location among the locations estimated as a failure causing location by the first failure location estimation unit 14. Further, in the system failure information illustrated in FIG. 8, the unit to which the port 1 of the switch 30 belongs, the date/time when the first obtaining unit 12 obtains the AER register, and the severity correspond to the port 1 of the switch 30. The unit to which the port 1 of the switch 30 belongs, the date/time when the first obtaining unit 12 obtains the AER register, and the severity are information generated from the first obtaining unit 12 and are notified to the MC 40 by the request unit 15.

Further, in the system failure information illustrated in FIG. 8, the gist, which is the master abort, notified by the first notification unit 13 corresponds to a port 0 of the switch 32 acquired based on the bus number in which the master abort occurs, which is notified by the first notification unit 13. Further, in the system failure information illustrated in FIG. 8, the unit to which the port 0 of the switch 32 belongs, the date/time when the first obtaining unit 12 obtains the information indicating that the master abort occurs, and the severity correspond to the port 0 of the switch 32. The unit to which the port 0 of the switch 32 belongs, the date/time when the first obtaining unit 12 obtains the information indicating that the master abort occurs, and the severity are information generated from the first obtaining unit 12 and are notified to the MC 40 by the first notification unit 13.

Further, in the system failure information illustrated in FIG. 8, the content of the AER register of the port 2 of the switch 32 corresponds to the port 2 of the switch 32 estimated as the failure causing location by the second failure location estimation unit 42. In addition, in the system failure information illustrated in FIG. 8, the unit to which the port 2 of the switch 32 belongs, a date/time when the second obtaining unit 41 obtains the AER register, and the severity correspond to the port 2 of the switch 32. The unit to which the port 2 of the switch 32 belongs, the date/time when the second obtaining unit 41 obtains the AER register, and the severity are information generated from the second obtaining unit 41.

Further, the second notification unit 43 notifies the port 2 of the switch 32, which is the failure causing location, estimated by the second failure location estimation unit 42 and the internal uncorrectable error which is the content of the AER register of the failure location, to the CPU 10. When the determination unit 16 determines that the failure location is inseparable by the internal uncorrectable error of the port 2 of the switch 32, the reset instruction unit 18 instructs, for example, the MC 40 to reset the system 1. Then, the reset unit 45 resets the system 1.

Meanwhile, when the determination unit 16 determines that the failure location is separable by the internal uncorrectable error of the port 2 of the switch 32, the termination unit 17 terminates the application or the virtual machine that uses the failure location estimated by the second failure location estimation unit 42. For example, when the determination unit 16 identifies that the application B uses all the PCI-Cards 81 connected to the lower layer of the switch 32, the termination unit 17 terminates the application B.

As such, in the system 1 according to an example of an embodiment, the failure causing location may be estimated with certainty and high precision, even when the master abort occurs.

Further, since the determination unit 16 determines whether the failure location is separable based on the failure causing location estimated by the second failure location estimation unit 42, the system 1 may be operated without resetting if possible, even when the master abort occurs.

Further, the manager of the system 1 refers to the system failure information generated by the generation unit 44 to easily determine the cause of the failure and a secondary failure which occurs by the cause.

Note that, a technique of a disclosure is not limited to the foregoing embodiment and various modifications may be made within the scope without departing from the spirit of the embodiment.

For example, in an example of the embodiment, the switch 30 includes three ports, but the present invention is not limited thereto and the switch 30 includes any number of ports. Similarly to the switch 30, the switches 31 and 32 are not limited to an example of the embodiment and include any number of ports.

Further, in an example of the embodiment, the PCI-Express is described, but the present invention is not limited thereto and may be applied even to PCI or PCI-X.

Further, in an example of the embodiment, the system 1 includes the three switches 30 to 32, but the present invention is not limited thereto. For example, the system 1 may have two or less or four or more switches.

In addition, in an example of the embodiment, the system 1 includes the eight PCI-Cards 80 and 81, but the present invention is not limited thereto. For example, the system 1 may have seven or less or nine or more PCI-Cards.

Further, for example, in an example of the embodiment, the first memory unit 2 is connected to the CPU 10, but the present invention is not limited thereto. For example, the first memory unit 2 may be connected to the IO hub 21. In addition, when the first memory unit is connected to the CPU 10, another memory unit connected to the IO hub 21 is provided and the BIOS may be memorized in other memory unit.

Further, in an example of the embodiment, the determination unit 16 determines whether the failure location is separable from the system 1, regardless of whether the master abort occurs, but the present invention is not limited thereto. For example, only when the master abort does not occur, the determination unit 16 may determine whether the failure location is separable from the system 1 and in this case, the second notification unit 43 does not notify information to the CPU 10.

Further, in an example of the embodiment, the determination unit 16 determines whether the failure location is separable based on the failure causing location estimated by the second failure location estimation unit 42 or the first failure location estimation unit 14, but the present invention is not limited thereto. For example, it may be determined whether the failure location is separable based on the failure causing location estimated by the second failure location estimation unit 42 or the first failure location estimation unit 14 and the content of the AER register of the corresponding failure causing location. In this case, the system 1 has, for example, information, which becomes a reference indicating whether the failure location is separable, in the first memory unit 2 in advance. In addition, the determination unit 16 determines whether the failure location is separable by, for example, comparing the information with the failure causing location estimated by the second failure location estimation unit 42 or the first failure location estimation unit 14 and the content of the AER register of the corresponding location. The same applies to the content of the AER register of the failure causing location estimated by the first failure location estimation unit 14. In addition, similarly, it may be determined whether the failure location is separable based on the content of the AER register of the failure causing location estimated by the second failure location estimation unit 42 or the first failure location estimation unit 14.

According to the system and the method of processing a failure, even when the master abort occurs, the failure causing location can be estimated with high precision.

The embodiment may be worked and manufactured by those skilled in the art by the aforementioned disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system, comprising:
    a first processing unit;
    a second processing unit; and
    devices connected to the first processing unit via a first route and connected to the second processing unit via a second route,
    wherein the first processing unit includes,
    a first obtaining unit that obtains failure information held by the devices via the first route when a failure occurs in the system, and
    a first notification unit that notifies to the second processing unit non-response information indicating a state in which the failure information is not able to be obtained when the failure information is not able to be obtained from the devices by the first obtaining unit,
    the second processing unit includes,
    a second obtaining unit that obtains the failure information from the devices via the second route when the non-response information is notified from the first notification unit,
    a failure location estimation unit that estimates a failure causing location on the basis of the failure information obtained by the second obtaining unit, and
    a second notification unit that notifies the failure location estimated by the failure location estimation unit to the first processing unit, and
    the first processing unit includes,
    an identification unit that identifies a subject using the failure location estimated by the failure location estimation unit, and
    a termination unit that terminates the subject identified by the identification unit.

2. The system according to claim 1, wherein the plurality of devices are provided,
    the plurality of devices are connected to each other in multiple stages via the first route with the first processing unit as an upper level, and
    the second obtaining unit obtains via the second route failure information which is not obtained by the first obtaining unit.

3. The system according to claim 2, wherein the first notification unit notifies to the second processing unit positional information indicating a storage position of the failure information which is not obtained by the first obtaining unit, and
    the second obtaining unit obtains the failure information which is not obtained by the first obtaining unit, on the basis of the positional information.

4. The system according to claim 3, wherein the positional information indicates a storage position of failure information held by a top-level device, among the failure information which is not obtained by the first obtaining unit, and
    the second obtaining unit obtains the failure information held by the top-level device and failure information held by a device connected to a lower level of the top-level device, on the basis of the positional information.

5. The system according to claim 4, further comprising a generation unit that generates system failure information on the basis of a failure causing location (hereinafter, referred to as a second failure causing location) estimated by the second failure location estimation unit and failure information of the second failure causing location.

6. The system according to claim 5, wherein the first processing unit includes,
   a first failure location estimation unit that estimates a failure causing location on the basis of the failure information obtained by the first obtaining unit, and
   a third notification unit that notifies a failure causing location (hereinafter, referred to as a first failure causing location) estimated by the first failure location estimation unit and failure information of the first failure causing location, to the second processing unit, and
   the generation unit generates the system failure information on the basis of the first failure causing location notified by the third notification unit, the failure information of the first failure causing location, the second failure causing location, the failure information of the second failure causing location, the non-response information, and the positional information.

7. The system according to claim 1, wherein the first notification unit notifies the non-response information to the second processing unit when the first obtaining unit is not able to obtain the failure information for a predetermined time.

8. A method of processing a failure in a system including a first processing unit and a second processing unit, comprising:

obtaining, by the first processing unit, failure information held by devices connected to the first processing unit and the second processing unit via a first route and a second route respectively, via the first route when a failure occurs in the system;

notifying, by the first processing unit, to the second processing unit non-response information indicating that the devices make non-response, when failure information is not able to be obtained by the first processing unit;

obtaining, by the second processing unit, failure information from the devices via the second route when the non-response information is notified by the first processing unit;

estimating, by the second processing unit, a failure causing location on the basis of the failure information obtained by the second processing unit;

notifying, by the second processing unit, to the first processing unit the failure location estimated by the second processing unit;

identifying, by the first processing unit, a subject using the failure location estimated by the second processing unit; and terminating the subject identified by the first processing unit.

* * * * *